United States Patent
Jan et al.

(10) Patent No.: US 9,332,496 B2
(45) Date of Patent: May 3, 2016

(54) ENHANCED IEEE POWER SAVE IN AD HOC WIRELESS MODE

(75) Inventors: James Jan, San Jose, CA (US); Robert Lee, Fremont, CA (US); Long Chow, Saratoga, CA (US); Frank Huang, Pleasanton, CA (US); Xiaohua Luo, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 2087 days.

(21) Appl. No.: 11/944,103

(22) Filed: Nov. 21, 2007

(65) Prior Publication Data
US 2008/0125190 A1    May 29, 2008

Related U.S. Application Data

(60) Provisional application No. 60/867,497, filed on Nov. 28, 2006.

(51) Int. Cl.
*H04B 1/38* (2015.01)
*H04W 52/02* (2009.01)
*H04W 84/18* (2009.01)

(52) U.S. Cl.
CPC .......... *H04W 52/0216* (2013.01); *H04W 84/18* (2013.01); *Y02B 60/50* (2013.01)

(58) Field of Classification Search
CPC ... H04W 52/0216; H04W 84/18; Y02B 60/50
USPC ......... 455/127.5, 574, 343.1–343.3; 370/311, 370/318, 328, 338, 329, 341
See application file for complete search history.

(56) References Cited

U.S. PATENT DOCUMENTS

| | | | | |
|---|---|---|---|---|
| 5,625,882 A * | 4/1997 | Vook et al. | | 340/7.34 |
| 5,995,853 A * | 11/1999 | Park | | 455/574 |
| 6,256,299 B1 * | 7/2001 | Chavez et al. | | 370/329 |
| 7,408,887 B2 * | 8/2008 | Sengupta et al. | | 370/252 |
| 2002/0131371 A1 * | 9/2002 | Rudnick | | 370/252 |
| 2004/0105401 A1 * | 6/2004 | Lee | | 370/311 |
| 2004/0240422 A1 * | 12/2004 | Kim | | 370/348 |
| 2004/0253996 A1 | 12/2004 | Chen et al. | | |
| 2005/0059420 A1 | 3/2005 | Salokannel et al. | | |

(Continued)

FOREIGN PATENT DOCUMENTS

| | | |
|---|---|---|
| JP | 2005102164 A | 4/2005 |
| JP | 2006074450 A | 3/2006 |

(Continued)

OTHER PUBLICATIONS

PCT Notification of Transmittal of the International Search Report and the Written Opinion of the International Searching Authority, or the Declaration, International Application No. PCT/US2007/024450, International filing date: Nov. 26, 2007, mailed Apr. 14, 2008, 13 pages.

*Primary Examiner* — Kashif Siddiqui

(57) ABSTRACT

In accordance with the invention, a method, system and apparatus for saving power consumed by a station in an ad hoc wireless network are presented. The method comprises transmitting or receiving a signal by a station in the ad hoc wireless network during a beacon interval. The station enters a power saving doze state immediately following the transmission or reception of the signal and prior to the end of the beacon interval. Additionally or alternatively, the station may enter power saving doze state following a timed period, according to a counter, or according to a periodic pattern.

10 Claims, 10 Drawing Sheets

(56) References Cited

U.S. PATENT DOCUMENTS

| | | |
|---|---|---|
| 2005/0070340 A1* | 3/2005 | Kim .................... 455/574 |
| 2005/0117530 A1* | 6/2005 | Abraham et al. ............ 370/310 |
| 2005/0198221 A1 | 9/2005 | Manchester et al. |
| 2006/0285527 A1* | 12/2006 | Gao et al. .................. 370/338 |
| 2007/0036096 A1* | 2/2007 | Sinivaara .................. 370/318 |
| 2007/0120734 A1* | 5/2007 | Salkhi .................. 342/357.06 |
| 2007/0226403 A1* | 9/2007 | Son et al. .................. 711/103 |

FOREIGN PATENT DOCUMENTS

| | | |
|---|---|---|
| TW | I234970 B | 6/2005 |
| TW | 200618543 A | 6/2006 |
| WO | WO 2006/033443 A1 | 3/2006 |
| WO | WO2006033443 A1 | 3/2006 |

* cited by examiner

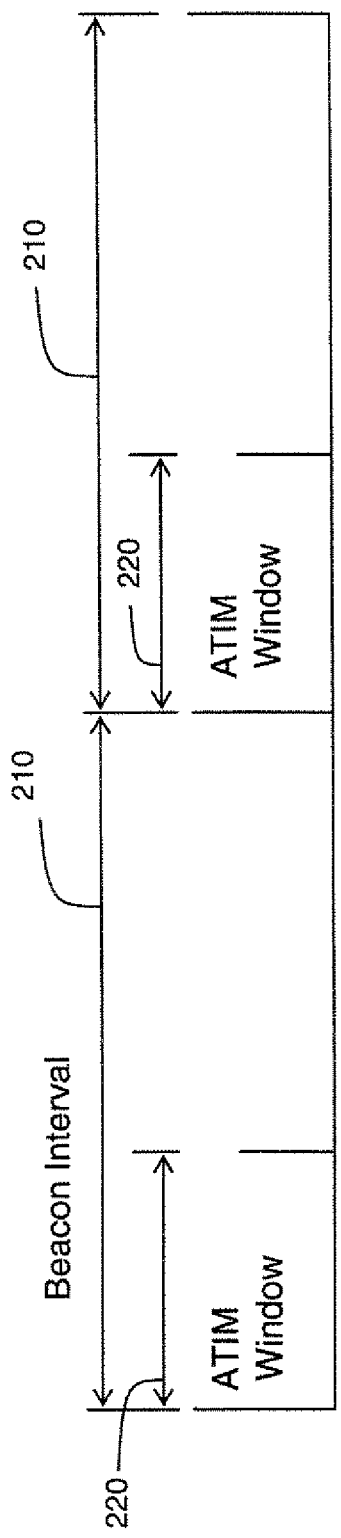
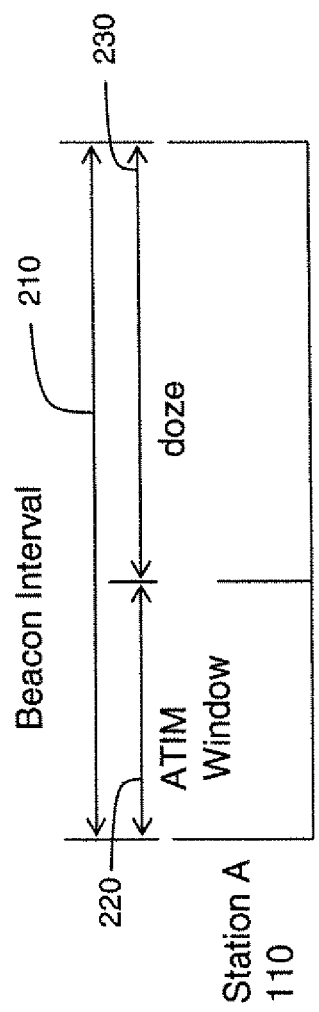

ENHANCED IEEE POWER SAVE IN AD HOC WIRELESS MODE

RELATED APPLICATIONS

This application claims the benefit of priority to U.S. Provisional Application No. 60/867,497 filed Nov. 28, 2006, titled "Enhanced IEEE Power Save in Ad Hoc Mode," which is herein incorporated by reference in its entirety.

FIELD OF THE INVENTION

The present invention relates generally to power management in wireless networks. More specifically, the present invention relates to methods and systems for power management of wireless local area networks in ad hoc mode.

BACKGROUND OF THE INVENTION

Wireless Local Area Networks (WLANs) have two basically operation modes: infrastructure and ad hoc wireless. In infrastructure mode, mobile nodes communicate with each other via an access point (AP). In ad hoc wireless mode, peer devices may communicate directly without going through an AP, that is, without a network infrastructure. As such, the ad hoc wireless mode is useful for establishing a network where a wireless infrastructure does not exist and an AP is not accessible.

WLANs are comprised of basic service sets (BSS), each BSS including of at least two stations (STAs) within each other's transmission range. A BSS in an ad hoc wireless network is also referred to as an Independent BSS (IBSS). Mobile stations within an ad hoc wireless network or IBBS may randomly or periodically enter or exit the ad hoc wireless network.

IEEE 802.11 provides guidelines for operating WLANs in ad hoc wireless mode. Since many stations in WLANs are portable and battery-operated (e.g. cellular phones, laptop computers, personal digital assistants (PDAs), wireless digital cameras, etc.), power consumption is a big concern and power saving is critically important in order to extend the operating life of the stations in the WLAN. Power may be best saved in wireless communication devices by switching them off.

The current IEEE 802.11 standard provides for a power save state that allows for one or more components of a wireless station to enter a low power, or "doze" state, for the portion of a beacon interval following the an announcement traffic indication message (ATIM) window. The wireless station may then be awoken at the start of the next beacon period as necessary to transmit and/or receive transmissions.

However, IEEE 802.11 currently provides that a station is only eligible to doze for a remainder of a beacon interval if certain conditions occur, that is, if the station has not transmitted a beacon signal, not received an ATIM management packet, and not transmitted ATIM management packets within a beacon period. The IEEE 802.11 standard does not currently allow a station to sleep at other times even though the station may not be needed or in use. Therefore, on many occasions, a station is unnecessarily awake (and consuming power) for the remainder of a beacon period.

Accordingly, it would be desirable to have additional methods and systems for minimizing power consumption by stations in an ad hoc wireless WLAN.

SUMMARY

Consistent with principles of the inventions, methods, systems and apparatuses for saving power consumed by a station in an ad hoc wireless network are presented. A signal is transmitted or received by a station in the ad hoc wireless network during a beacon interval. The station enters a power saving doze state immediately following the transmission or reception of the signal during the beacon interval and prior to the end of the beacon interval.

Additionally or alternatively, in certain methods, systems, and apparatuses for saving power consumed by an active station in an ad hoc wireless network consistent with the present inventions, an active station transmits or receives signals during a beacon interval. A period of the beacon interval after the ATIM window is timed and it is determined whether the station is active during the timed period. The station enters a power saving doze state in the ad hoc wireless network, prior to the end of the beacon interval, based upon the determination that the station is inactive during the timed period.

Further methods, systems, and apparatuses for saving power consumed by a station in an ad hoc wireless network are presented in which a beacon is transmitted at the beginning of a beacon interval. It is determined whether an ATIM has been transmitted or received within the beacon interval after transmission of the beacon. If a counter has not reached a nap threshold, remaining awake and incrementing the counter, or if the counter has reached a nap threshold, the station enters a power saving doze state immediately following the transmission or reception of the signal during the beacon interval and prior to the end of the beacon interval.

A system for saving power consumed by a station in an ad hoc wireless network, wherein signals are transmitted or received by the station in the ad hoc wireless network during a beacon interval, comprises a transceiver for transmitting or receiving a signal by the station in the ad hoc network during the beacon interval; and a monitor for detecting the level of activity for the station after the ATIM window of the beacon interval, and causing the station to enter a power saving doze state immediately following the transmission or reception of a signal during the beacon interval and prior to the end of the beacon interval. The system may also comprise a counter for counting inactive beacon intervals; and a comparator for determining when the counter has reached a nap threshold, and causing the station to remain awake or enter a power saving doze state based on the comparison.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The accompanying drawings, which are incorporated in and constitute a part of this specification, illustrate embodiments of the invention and, together with the description, serve to explain the principles of the invention.

BRIEF DESCRIPTION OF THE DRAWINGS

FIG. 2A is diagram showing a conventional series of beacon intervals which include ATIM windows for a station in an ad hoc wireless network.

FIG. 2B is diagram showing a conventional station that is not transmitting or receiving signals in an ad hoc wireless network.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
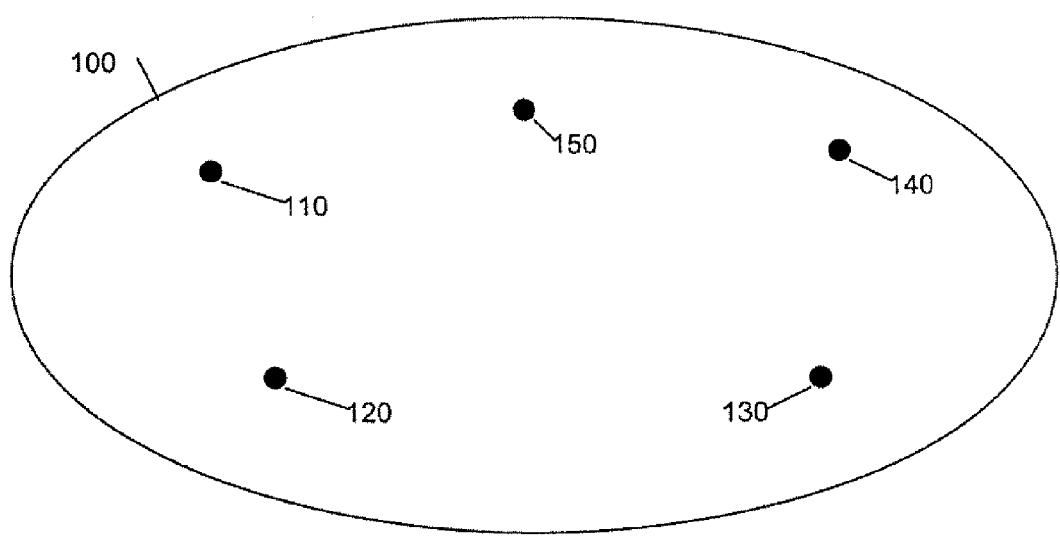
FIG. 1 is a diagram showing a conventional ad hoc wireless network comprising five stations.

FIG. 1 is a diagram of an exemplary prior art ad hoc wireless network 100 showing five stations: a station A 110, a station B 120, a station C 130, a station D 140, and a station E 150. In an ad hoc wireless network compliant with IEEE 802.11, each station generates a beacon that is used to synchronize communications between the stations. The station that initiates the IBSS establishes the beacon interval that facilitates synchronization. Stations in an IEEE 802.11-compliant network transmit signals at the defined beacon interval for the network in order to be in synchronization with the other stations in the network. ATIM are used to indicate when one station has data for another station in the ad hoc wireless network. ATIM are sent at the beginning of a beacon interval during the so-called ATIM window. All stations in an IBSS wake up prior to the beginning of the beacon interval and remain awake until the end of the ATIM window.

Figure 2C:
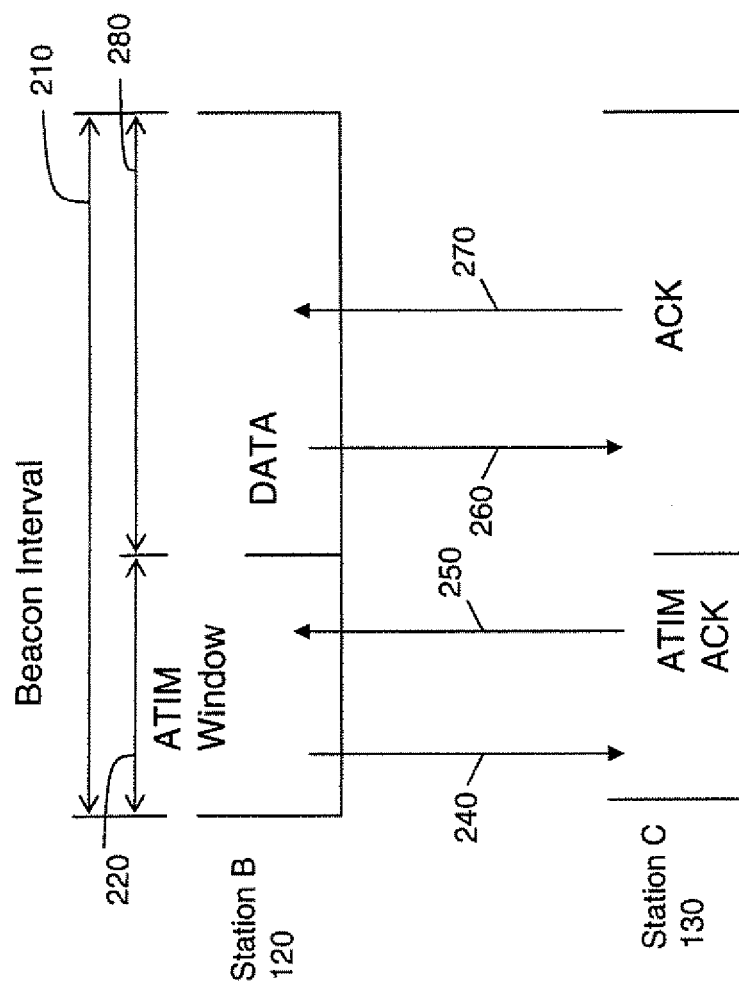
FIG. 2C is diagram showing a conventional transmission of data between two stations in an ad hoc wireless network.

FIGS. 2A-2C illustrate various scenarios that may occur consistent with the IEEE 802.11 standard. FIG. 2A is a diagram showing beacon intervals 210, each with an ATIM window 220 occurring at the beginning of each beacon interval 210. Beacon interval 210 is a time period for the transmission of signals between stations A-E 110-150 in ad hoc wireless network 100. During ATIM window 220, stations A-E 110-150 in ad hoc wireless network 100 are in an awake state, transmitting beacons and/or ATIMs to other stations or listening for beacons and/or ATIMs from other stations.

FIG. 2B is a diagram showing a station A 110, beacon interval 210, and ATIM window 220. Station A 110 will remain awake during ATIM window 220. However if station A 110 does not transmit a beacon, does not receive an ATIM, and does not transmit an ATIM during the ATIM window 220, it may go into a doze state 230 in order to save power. In doze state 230, power is saved because some or all of station A's 110 functions are temporarily turned off. During doze state 230, station A 110 may be unable to transmit or receive signals. According to IEEE 802.11, doze state 230 continues until the next ATIM window 220 of the next, consecutive beacon interval 210 when station A 110 wakes up and remains awake for the duration of ATIM window 220. This process will repeat itself in subsequent beacon intervals 210 until station A 110 receives or sends an ATIM to another station, or transmits a beacon in ad hoc wireless network 100.

FIG. 2C is a diagram showing a transmission of data between two stations in ad hoc wireless network 100. FIG. 2C shows station B 120, station C 130, beacon interval 210, ATIM window 220, an ATIM 240, an acknowledgement (ACK) 250, a data packet 260, an ACK 270 and an awake state interval 280. As shown in FIG. 2C, station B 120 sends ATIM 240 to station C 130. ATIM 240 may, for example, announce to station C 130 that it has data 260 to transmit to station C 130. Upon receiving ATIM 240, station C 130 sends ACK 250 to station B 120. Upon receipt of ACK 250, station B 120 transmits data 260 to station C 130. Upon receipt of data 260, station C 130 sends ACK 270 to station B 120 that may signify to station B 120 that station C 130 received data 260. In prior art systems compliant with IEEE 802.11, station B 120 and station C 130 will remain in awake state 280 for the remainder of beacon interval 210, even though they may finish transmitting and/or receiving data prior to the end of beacon interval 210.

Upon the conclusion of beacon interval 210, a new beacon interval 210 will occur and if station B 120 has data to transmit to station C 130, the process described above will repeat itself. If station B 120 does not have data to transmit to station C 130, the process shown in FIG. 2B will occur, and stations B 120 and C 130 will doze at the end of the ATIM window 220, if station B 120 and station C 130 have not transmitted a beacon.

Figure 3A:
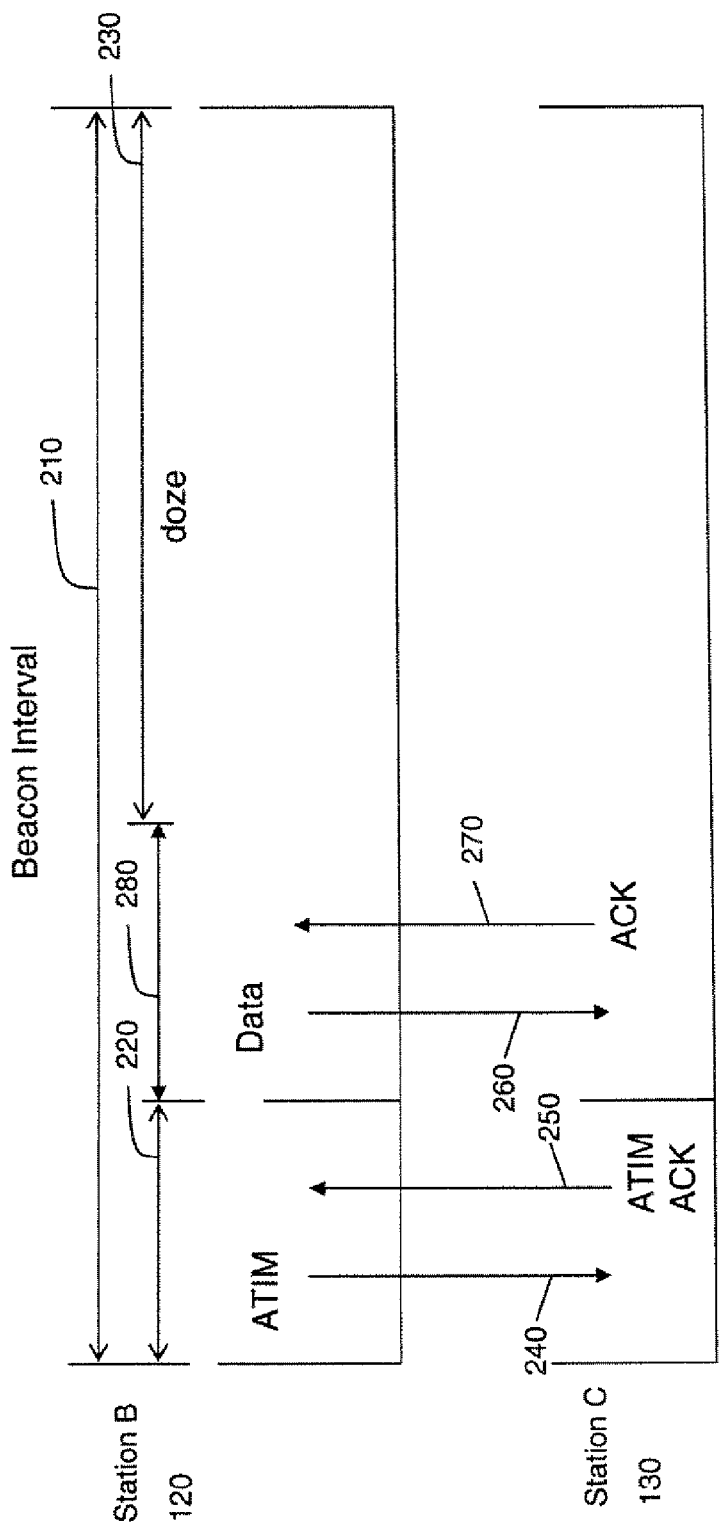
FIG. 3A is diagram showing a transmission of data between two stations in an ad hoc wireless network, consistent with embodiments of the present invention.

FIG. 3A is diagram showing a transmission of data between station B 120 and station C 130 in an ad hoc wireless network. FIG. 3 shows beacon interval 210, ATIM window 220, ATIM 240, ACK 250, data packet 260, ACK 270, awake state period 280 and power saving doze period 230. As shown in FIG. 3, station B 120 sends ATIM 240 to station C 130. ATIM 240 may, for example, announce to station C 130 that it has data to transmit to station C 130. Upon receiving ATIM 240, station C 130 sends ACK 250 to station B 120. Upon receipt of ACK 250, station B 120 transmits data 260 to station C 130 during awake state period 280. Upon receipt of data 260, station C 130 sends ACK 270 to station B 120. The level of activity of one or more of stations B and/or C is monitored. If there is no activity following receipt of ACK 270, for example, station B 120 may immediately enter and remain in doze state 230 for the remainder of beacon interval 210.

Figure 3B:
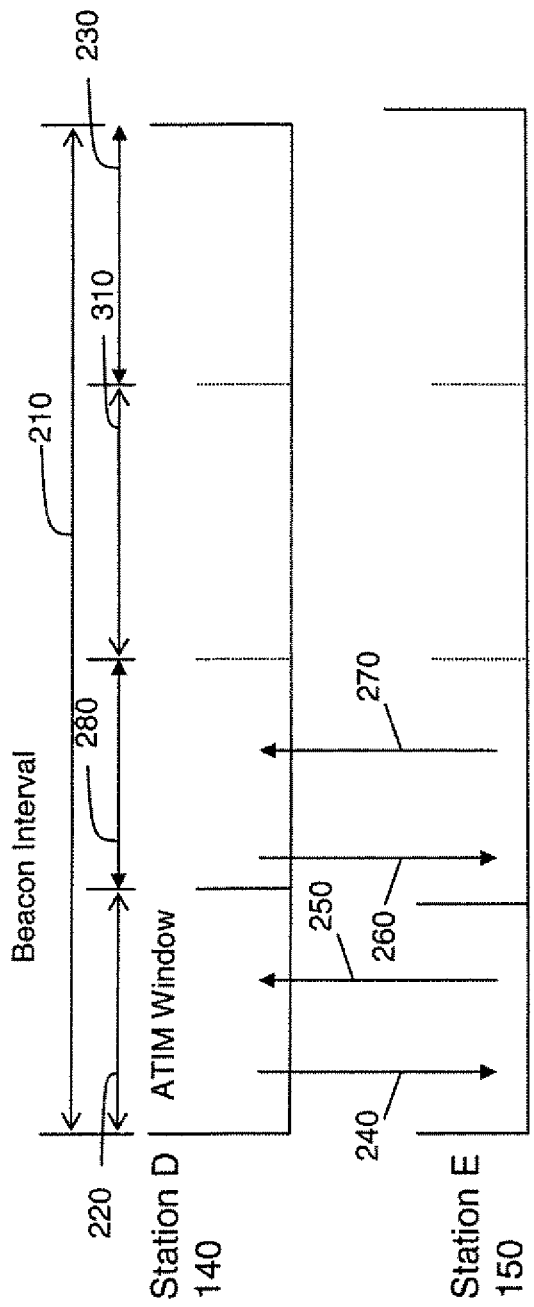
FIG. 3B is diagram showing a transmission of data between two stations in an ad hoc wireless network, consistent with embodiments of the present invention.
Figure 4:
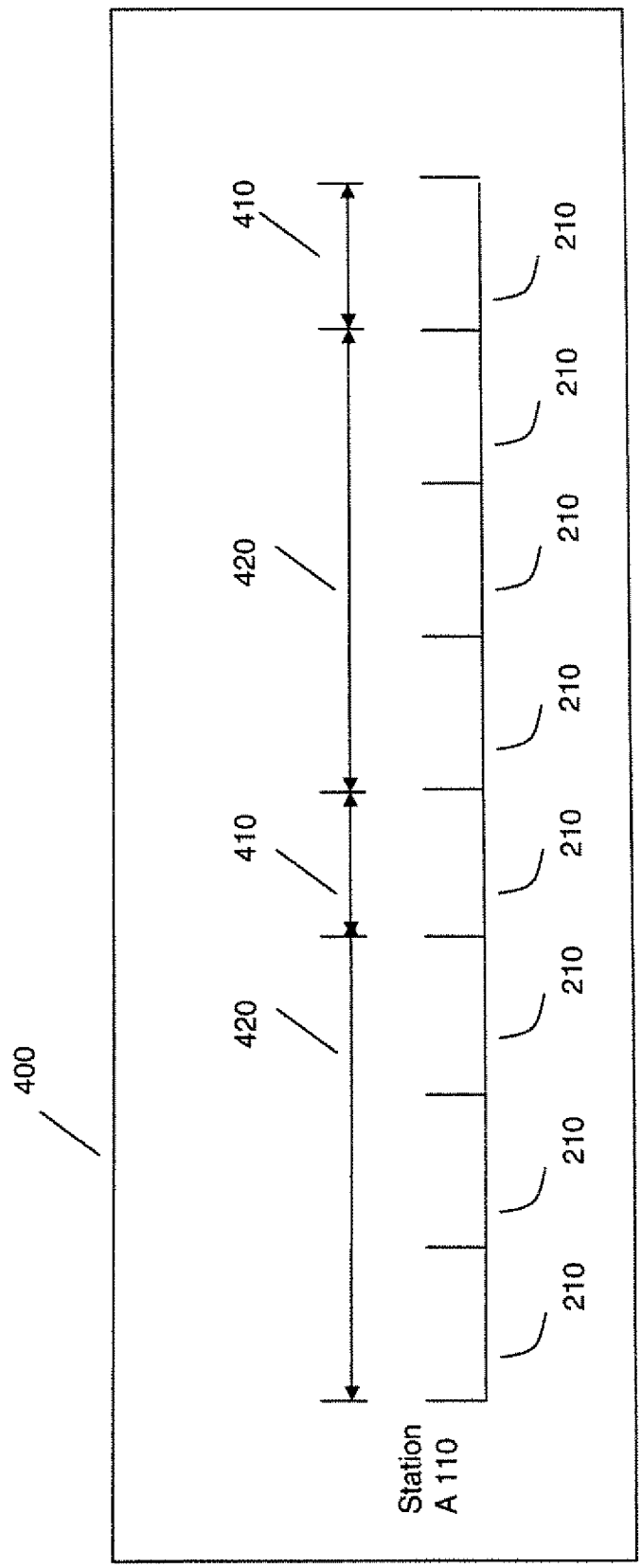
FIG. 4 is a diagram showing an exemplary periodic pattern of continuous beacon intervals, consistent with embodiments of the present invention.

FIG. 3B is a diagram showing a transmission of data between stations D 140 and E 150 in ad hoc wireless network 100. FIG. 4 shows stations D 140 and E 150, beacon interval 210, ATIM window 220, ATIM 240, ACK 250, data packet 260, ACK 270, a timed period 310, and power saving doze state period 230. As shown in FIG. 4, station D 140 sends ATIM 240 to station E 150. ATIM 240 announces to station E 150 that it has data 260 to transmit to station E 150. Upon receiving ATIM 240, station E 150 sends ACK 250 to station D 140. Upon receipt of ACK 250, station D 140 transmits data 260 to station E 150. Upon receipt of data 260, station E 150 sends ACK 270 to station D 140. The level of activity of stations D and/or E may be monitored. For example, after each transmission or receipt of an ATIM or ACK, a timer associated with the station may be restarted. If the timer for station D, for example, reaches a certain threshold, such as 20 ns, that is, if station D does not send or receive data during timed period 310, then station D may go into doze state 230 for the remainder of the beacon interval 210.

FIG. 4 is a diagram showing an exemplary periodic pattern of continuous beacon intervals for exemplary station A 110 in ad hoc wireless network 100. Periodic pattern 400 may include alternating, continuous segments of beacon intervals 210. The alternating beacon interval segments may be in awake state 410 or in power saving doze state 420. Segments 410 and 420 may be of any length. Periodic pattern 400 is programmable and may incorporate any combination or segments 410 and 420. Once periodic pattern 400 is implemented, station A 110 may enter a state, either awake or power saving doze, as dictated by periodic pattern 400. Station A 110 may remain in the state dictated by periodic pattern 400 until periodic pattern 400 changes to an alternate state. Then, station A 110 may enter an alternate state as dictated by periodic pattern 400 and may remain in that state until periodic pattern 400 alternates back to the original state.

Station A 110, during a power saving doze state segment 420, may wake up for an ATIM window of beacon interval 210, or may remain in a doze state for the entire beacon interval 210, including the ATIM window. The initiation of periodic pattern 400 may be, for example, automatic or set by a user. Periodic pattern 400 may operate such that when station A 110 is an isolated station it may not wake up for each ATIM window of beacon interval 210 in an attempt to communicate with another station. Station A 110 may conserve power resources as it may not be required to wake up for ATIM windows of every beacon interval 210.

The conventional IEEE Ad Hoc Power Saving Rule provides that a station is eligible to enter a doze state when it has neither transmitted a beacon or an ATIM nor received an ATIM. In embodiments of the present invention, a station may enter a doze state after it has transmitted a beacon provided it has not transmitted or received an ATIM within an ATIM window. Thus, embodiments of the present invention allow a station to enter doze state within the beacon interval even if it has transmitted a beacon.

In some situations, it may not be desirable to allow the station to nap according to the present invention every time the station has transmitted a beacon, but has not received or transmitted ATIM packets within the ATIM window. For example, it may be desirable to allow the station to nap according to the present invention only every nth time or it may be desirable to allow the station to stay awake for longer periods of time at certain intervals so that, for example, other stations in ad hoc network 100 may synchronize with it and probe it during this awake period. In either case, a counter (such as bcn_tx_nap_count) may be used. The counter may be, for example, set to 1 initially and incremented every time the station has not transmitted a beacon, and has not received or transmitted ATIM packets within the ATIM window.

In certain embodiments, a station may nap every time according to the principles of the present invention, but on the nth time may follow another napping procedure, such as the IEEE Ad Hoc Power Saving Rule, and may remain awake for an entire beacon period. Station A 110 may remain awake by, for example, disabling the mechanism that causes station A to immediately enter a doze state. After the nth time, the counter is reset to 1 for the next period.

In certain other embodiments, if the counter reaches a threshold (such as bcn_tx_nap_awake_period), the station may nap according to the present invention and the counter is reset to 1. Otherwise, the station may follow another napping procedure, such as the IEEE Ad Hoc Power Saving Rule.

Figure 5:
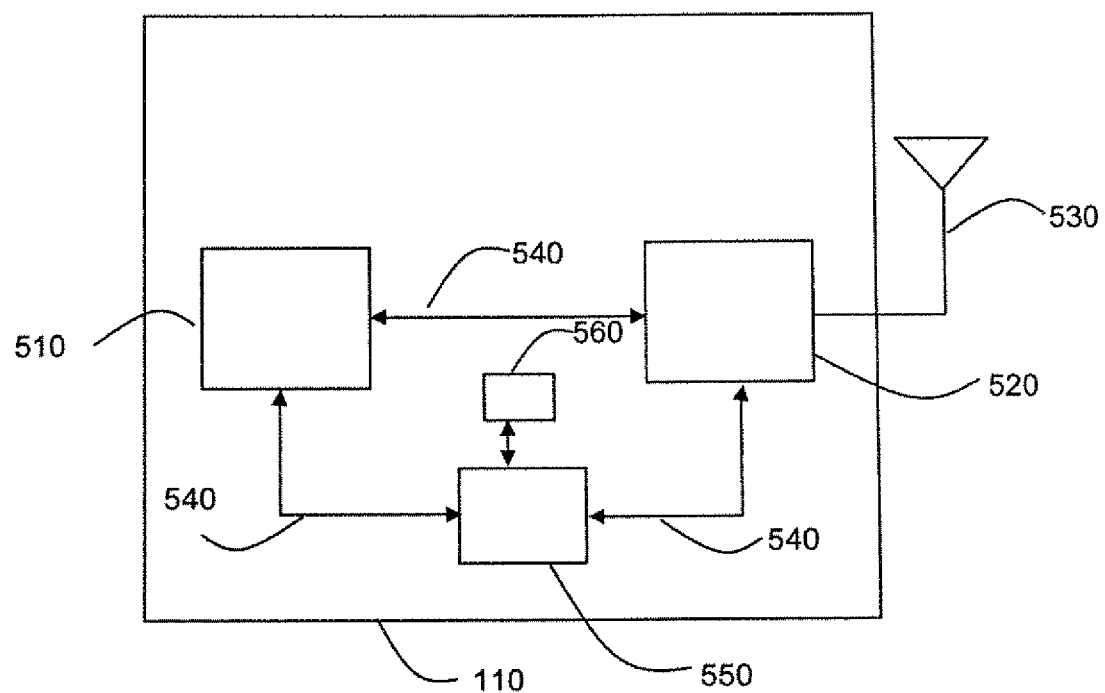
FIG. 5 is a diagram showing an exemplary station in an ad hoc wireless network, consistent with embodiments of the present invention.

FIG. 5 is a diagram showing exemplary station A 110 in ad hoc wireless network consistent with the present invention. Station A 110 may include, for example, a processor 510, a transceiver 520, an antenna 530, communication buses 540, a monitor 550, and a counter 560. Station A 110 may also include, for example, a timer (not shown). Processor 510 may be, for example, one or more microprocessors, application specific integrated circuits (ASICs), digital signal processors, similar devices, or a combination thereof. Processor 510 controls signals sent from and received by transceiver 520. Transceiver 520 transmits signals from station 110 and receives signals for station A via antenna 530. Transceiver 520 may transmit data, from station 110 to, for example, another station in ad hoc wireless network 100, and may receive data from, for example, another station in ad hoc wireless network 100.

Monitor 550 may be implemented in hardware or software. In at least one embodiment, monitor 550 is implemented in software code executed by processor 510. In some embodiments, monitor 550 may be implemented separately from processor 510 as software, or hardware, or a combination thereof. Monitor 550 may monitor transceiver 520 to detect the level of activity for station 110. When monitor 550 detects the station is inactive during a beacon interval, it causes the station to enter doze state prior to the end of the beacon interval. Monitor 550 may do so by, for example, causing transceiver 550 to enter doze state. In some embodiments, monitor 550 may instruct processor 510 to enter power saving doze state. In some embodiments, monitor 550 may alert processor 510 to the inactivity which may then cause transceiver 520 to enter power saving doze state prior to the end of the beacon interval.

Counter 560 may be implemented in hardware or software. In at least one embodiment, counter 560 is implemented in software code executed by processor 510. In some embodiments, counter 560 may be implemented separately from processor 510 as software, or hardware, or a combination thereof. Counter 560 may count the number of active and/or inactive beacon intervals that occur for station 110 over time. Counter 560 may be in communication with monitor 550 such that it is aware of the level of activity for station 110 during a beacon interval. When counter 560 counts a set number of inactive beacon intervals, it may instruct monitor 550 to cause the station to enter an awake state.

The timer may also be implemented in hardware or software. The timer may time the length of time of inactivity in a beacon interval following the transmission or receipt of an ATIM or ACK. The timer may be part of monitor 550 or separate from, but operatively connected to, monitor 550.

Figure 6:
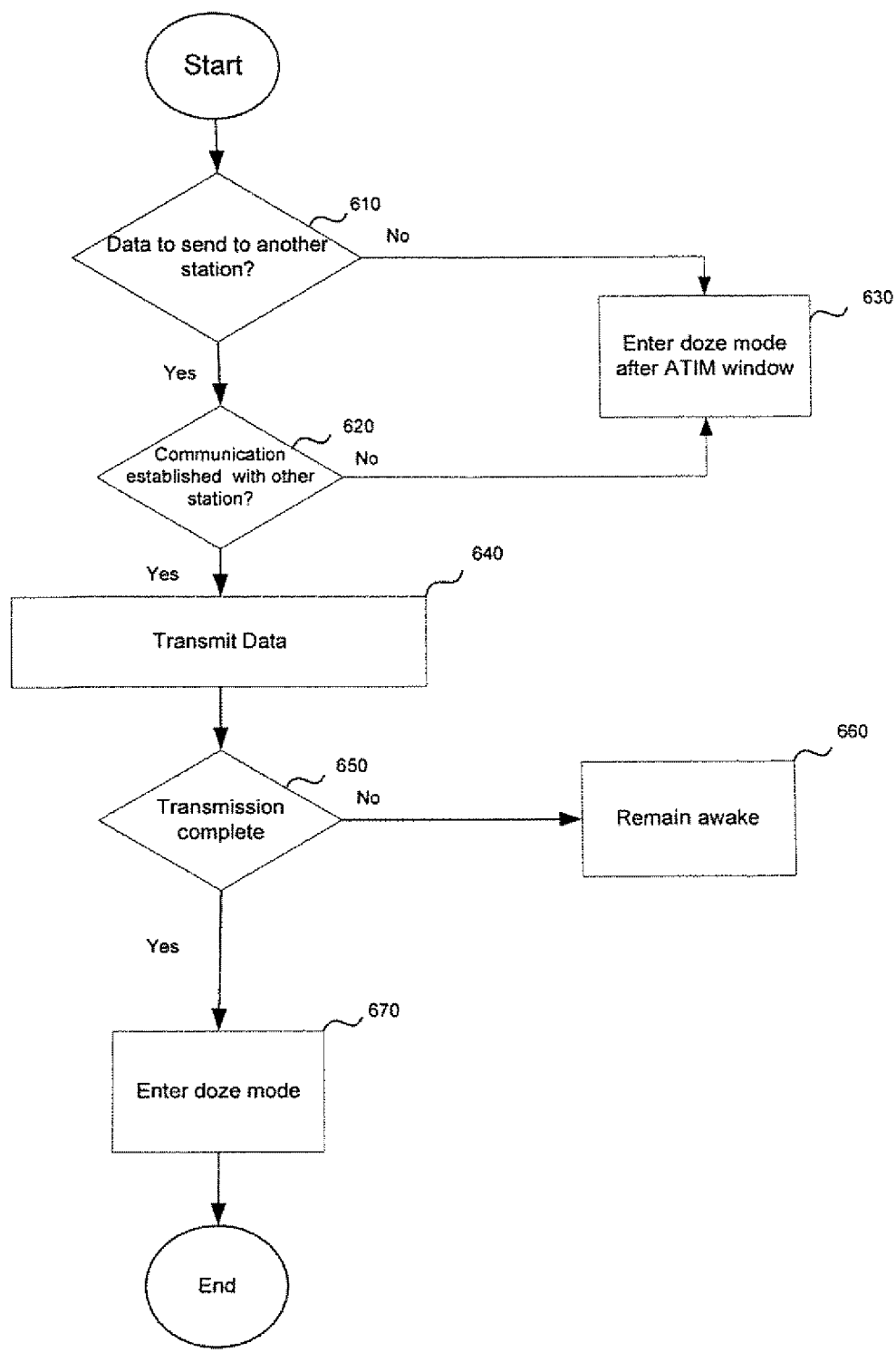
FIG. 6 is a flowchart showing an exemplary method for saving power in an ad hoc wireless network, consistent with embodiments of the present invention.

FIG. 6 is a flowchart showing an exemplary method for saving power by a station in an ad hoc wireless network 100 where at least one station, for example station A, may have data to send to another station (step 610) within a beacon interval. When station A does not have data to transmit, it may enter doze state after the ATIM window (step 630). When station A has data to transmit to another station, for example, station B may attempt to establish communication with station B (step 620). Communication may be established by station A by sending a message, for example an ATIM, to indicate to station B that it has data to send. Station B may send an acknowledgment to station A, for example an ACK, to indicate that it is ready to receive data from station A. When station A receives the ACK, data may be transmitted between stations A and B (step 640). Stations A and B may remain awake (step 660) until data transmission is complete (step 650). Upon completion of the data transmission, station(s) A and/or B immediately enters a power saving doze state prior to the end of the beacon interval (step 670). Station(s) A and/or B may remain in power the saving doze state for the remainder of the beacon interval.

Figure 7:
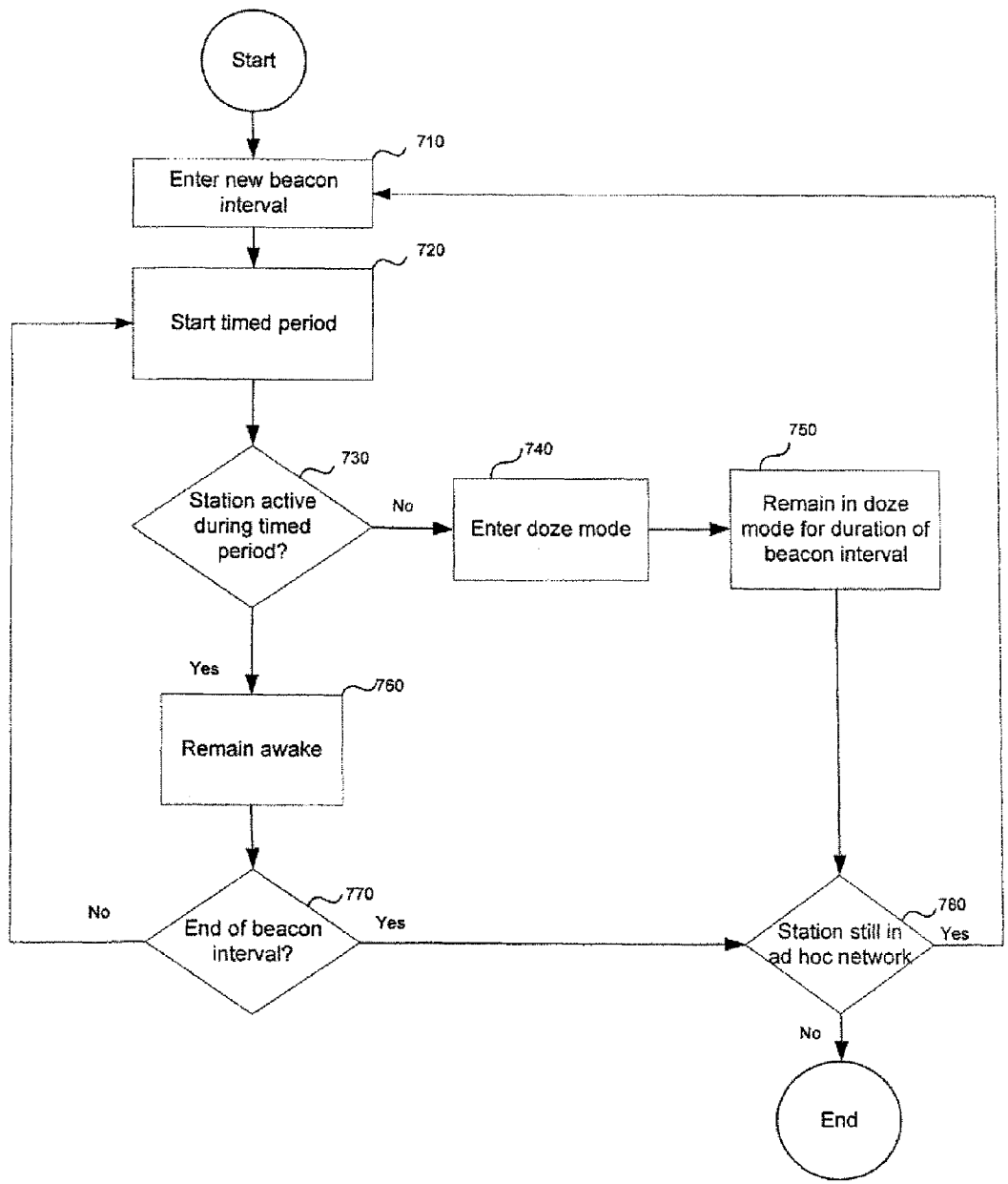
FIG. 7 is a flowchart showing an exemplary method for saving power in an ad hoc wireless network, consistent with embodiments of the present invention.

FIG. 7 is a flowchart showing an exemplary a method for saving power in ad hoc wireless network 100 wherein a station, for example station A, transmits or receives a signal in the beacon interval. In step 710, a new beacon interval is entered. During the new beacon interval, a timed period is started (step 720). Next, it is determined whether station A is active during the timed period (step 730). Activity by station A may include, for example, sending or receiving signals. If station A is inactive during the timed period, it may enter a power saving doze state prior to the end of beacon interval (step 740). Station A may remain in the power saving doze state for the duration of the beacon interval (step 750). If station A remains in the network (step 780), then the process described above may repeat itself. If station A does not remain in the network, then the process described above may end.

If station A is active during the timed period (step 730), then station A may remain in an awake state for the duration of the timed period (step 760). If the timed period ends prior to the end of the beacon interval (step 770), then the process described above, beginning with step 720, may be repeated until, for example, the end of the beacon interval (step 770). If station A is still in the network (step 780), then the process described above may repeat itself. If station A does not remain in the network, then the process described above may end.

Figure 8:
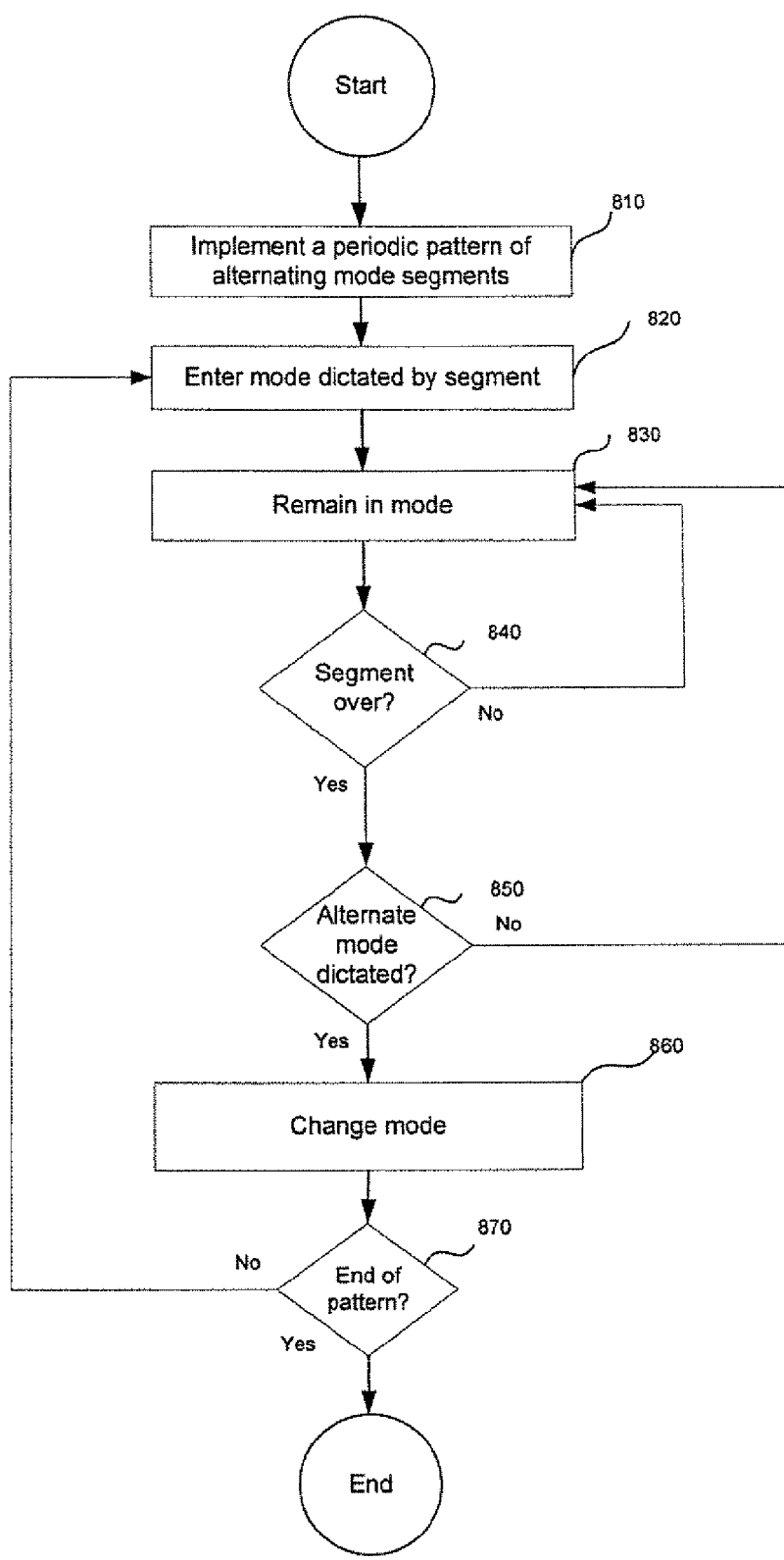
FIG. 8 is a flowchart showing an exemplary method for saving power in an ad hoc wireless network, consistent with embodiments of the present invention.

FIG. 8 is a flowchart showing an exemplary a method for saving power in an ad hoc wireless network. As shown in FIG. 8, a periodic pattern is implemented (step 810). In step 820, a station in an ad hoc wireless network may enter a state dictated by for example, segment 410 of periodic pattern 400 as shown in FIG. 4 (step 820). The station may remain in the state dictated by the segment (step 830) for the duration of the segment (step 840). When the segment is over (step 840), an alternate state may be dictated by the periodic pattern (step 850). When an alternate state is not dictated, then the station may remain in its current state. If an alternate state is dictated, the state of the station may be changed (step 860). The process described above may repeat itself until the periodic pattern ends (step 870).

Implementation of a periodic pattern, such as periodic pattern 400, may be used, for example, when a station is alone in an ad hoc network or is otherwise unable to communicate with other stations in the ad hoc wireless network.

The systems and methods disclosed herein are not inherently related to any particular computer or other apparatus, and may be implemented by a suitable combination of hardware, software, and/or firmware. Software implementations may include one or more computer programs. A computer program is a set of instructions readable and executable by a processor and can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network. Software may also be implemented as a computer program product, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for saving power by a device in communication with an ad hoc wireless network, the method comprising:
   during a beginning portion of each of multiple beacon intervals, transmitting, by the device, a respective beacon; and
   for each respective beacon interval of the multiple beacon intervals,
      determining whether an announcement traffic identification message (ATIM) is one of (i) transmitted or (ii) received by the device after the transmission of the respective beacon and during the respective beacon interval,
      comparing a counter to a threshold,
      (A) if the counter is less than the threshold and (B) if no ATIM is one of (i) received or (ii) transmitted during the respective beacon interval, incrementing the counter, and
      if the counter is equal to the threshold, having the device enter a power saving doze state during at least a part of the respective beacon interval.

2. The method of claim 1, wherein having the device enter a power saving doze state further comprises:
   having the device enter the power saving doze state after transmitting the respective beacon at a beginning of the respective beacon interval.

3. The method of claim 2, wherein having the device enter the power saving doze state further comprises:
   having the device remain in the power saving doze state after transmitting the respective beacon at a beginning of the respective beacon interval and for a remaining portion of the respective beacon interval.

4. The method of claim 1, further comprising:
   based on entering the power saving doze state, resetting the counter.

5. The method of claim 1, further comprising:
   refraining from transmitting or receiving signals while the device remains in the power saving doze state.

6. The method of claim 1, wherein the ad hoc wireless network is an independent basic service set (IBBS).

7. The method of claim 1, wherein the threshold has a pre-configured value, which remains unchanged irrespective of whether, for the respective beacon interval, ATIM is one of (i) received or (ii) transmitted.

8. The method of claim 1, further comprising:
   for each respective beacon interval of the multiple beacon intervals, (A) if the counter is less than the threshold and (B) if no ATIM is one of (i) received or (ii) transmitted during the respective beacon interval, refraining from entering the power saving doze state.

9. A method for saving power by a device in communication with an ad hoc wireless network, the method comprising:
   during a beginning portion of each of multiple beacon intervals, transmitting, by the device, a respective beacon; and
   for each respective beacon interval of the multiple beacon intervals,
      determining whether an announcement traffic identification message (ATIM) is one of (i) transmitted or (ii)

received by the device after the transmission of the respective beacon and during the respective beacon interval, comparing a counter to a threshold, if the counter is less than the threshold, (i) incrementing the counter and (ii) having the device enter a power saving doze state during at least a part of the respective beacon interval, and if the counter is equal to the threshold, having the device refrain from entering the power saving doze state during the respective beacon interval.

10. A system for communicating via an ad hoc wireless network, the system comprising:

a transceiver configured to (i) during a beginning portion of each of multiple beacon intervals, transmit a respective beacon, and (ii) transmit and/or receive announcement traffic identification messages (ATIM) during ATIM window of one or more of the multiple beacon intervals;

a monitor configured to determine, for each respective beacon interval of the multiple beacon intervals, whether an ATIM is one of (i) transmitted or (ii) received after the transmission of the respective beacon and during the respective beacon interval;

a counter configured to be incremented for each respective beacon interval during which no ATIM is one of (i) received or (ii) transmitted by the device; and a comparator configured to compare the counter to a threshold;

wherein for each respective beacon interval of the multiple beacon intervals, if the counter is less than the threshold and if no ATIM is one of (i) received or (ii) transmitted, the counter is configured to be incremented, and if the counter is equal to the threshold, the transceiver is configured to enter a power saving doze state during at least a part of the respective beacon interval.

\* \* \* \* \*